United States Patent [19]
Robinson

[11] Patent Number: 4,934,289
[45] Date of Patent: Jun. 19, 1990

[54] HOLE-FORMING GARDENING DEVICE

[76] Inventor: Joseph M. Robinson, 158 Eaton St., Buffalo, N.Y. 14208

[21] Appl. No.: 140,168

[22] Filed: Dec. 31, 1987

[51] Int. Cl.$^5$ .............................................. A01C 5/02
[52] U.S. Cl. ........................................ 111/99; 111/92
[58] Field of Search ...................... 111/89, 92, 94, 99; 292/DIG. 9, DIG. 17, 207; 172/21

[56] References Cited

U.S. PATENT DOCUMENTS

| | | | |
|---|---|---|---|
| 1,303,570 | 5/1919 | Miner | 111/99 |
| 2,044,871 | 6/1936 | Beasley | 111/99 |
| 2,382,221 | 8/1945 | Groth | 111/99 |
| 2,885,695 | 5/1959 | Feezel et al. | 292/DIG. 17 |

FOREIGN PATENT DOCUMENTS

| | | | |
|---|---|---|---|
| 2637852 | 3/1978 | Fed. Rep. of Germany | 111/94 |
| 1001577 | 2/1952 | France | 111/99 |
| 176656 | 3/1922 | United Kingdom | 111/99 |

Primary Examiner—Danton D. DeMille
Attorney, Agent, or Firm—Edwin T. Bean, Jr.; Martin G. Linihan; John C. Thompson

[57] ABSTRACT

A gardening device facilitating the planting of seeds, bulbs or the like includes a platen member having two opposite sides and a plurality of pegs releasably secured to one side of the platen member so as to project therefrom. A carrying handle is attached to the other side of the platen member for facilitating placement of the platen member upon and removal of the platen member from the soil. When the platen member is placed one-side-down upon prepared soil so that the pegs engage the soil and a moderate amount of pressure is applied to the other side of the platen member and generally toward the soil, the pegs penetrate the soil so as to form indentations therein. Upon removal of the device from the soil in a manner withdrawing the pegs from the indentations, the indentations provide formed openings in the soil for accepting seeds or bulbs.

2 Claims, 2 Drawing Sheets

U.S. Patent   Jun. 19, 1990   Sheet 1 of 2   4,934,289
Fig. 1.
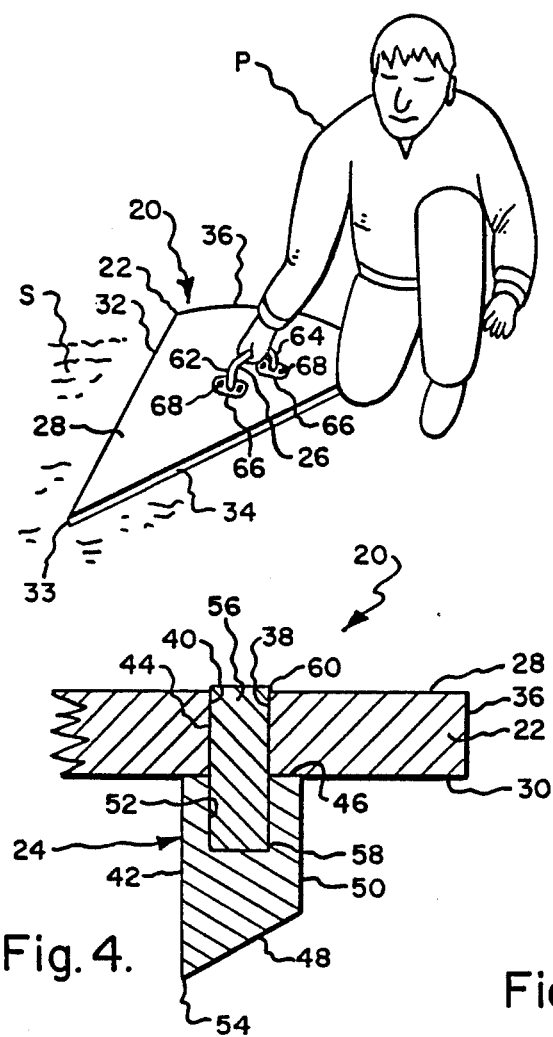
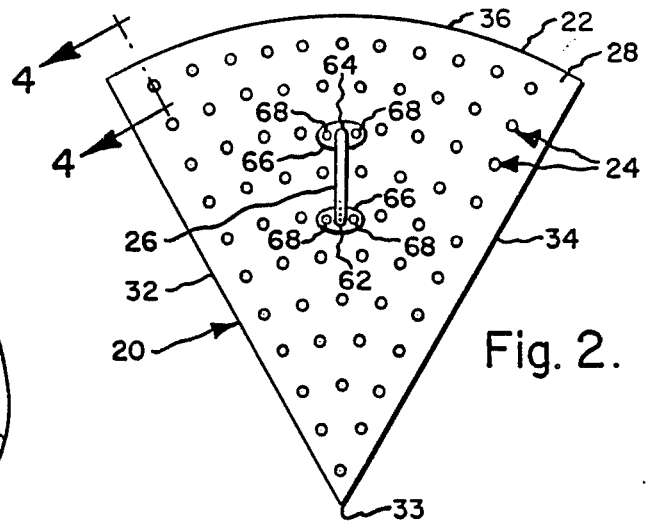
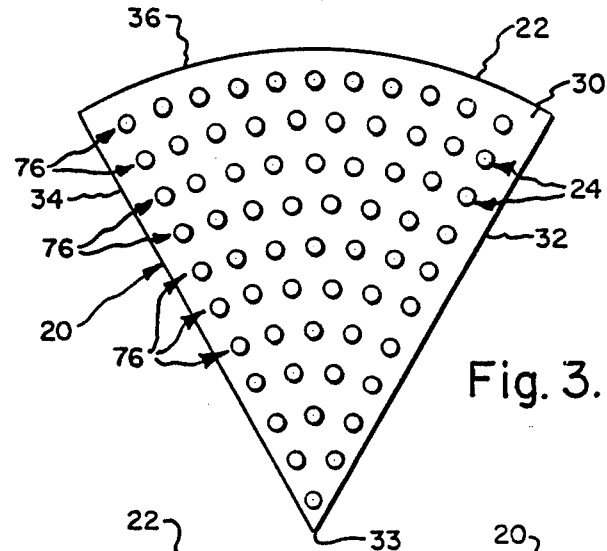
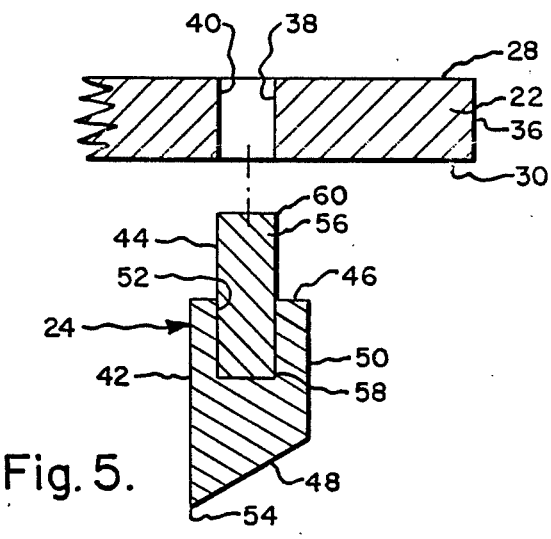
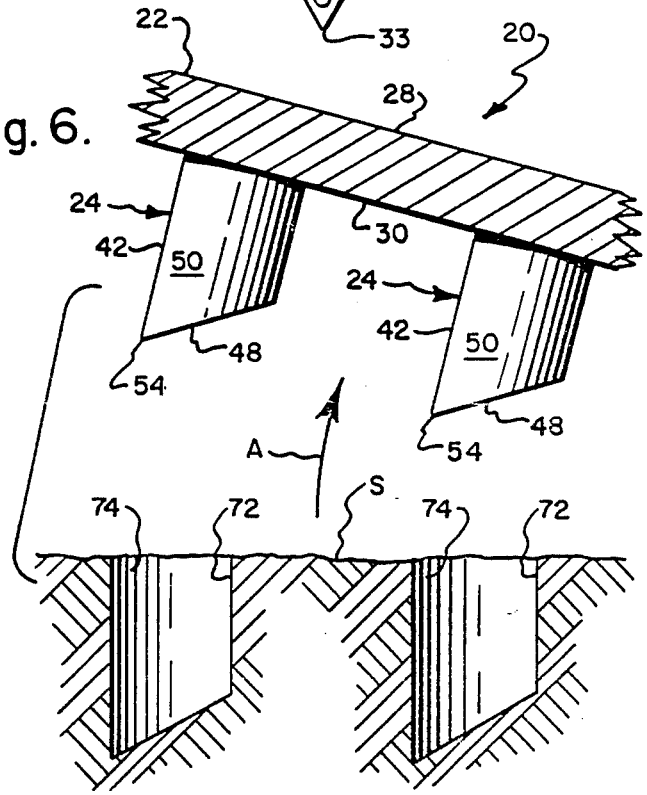
Fig. 2.
Fig. 3.
Fig. 4.
Fig. 5.
Fig. 6.

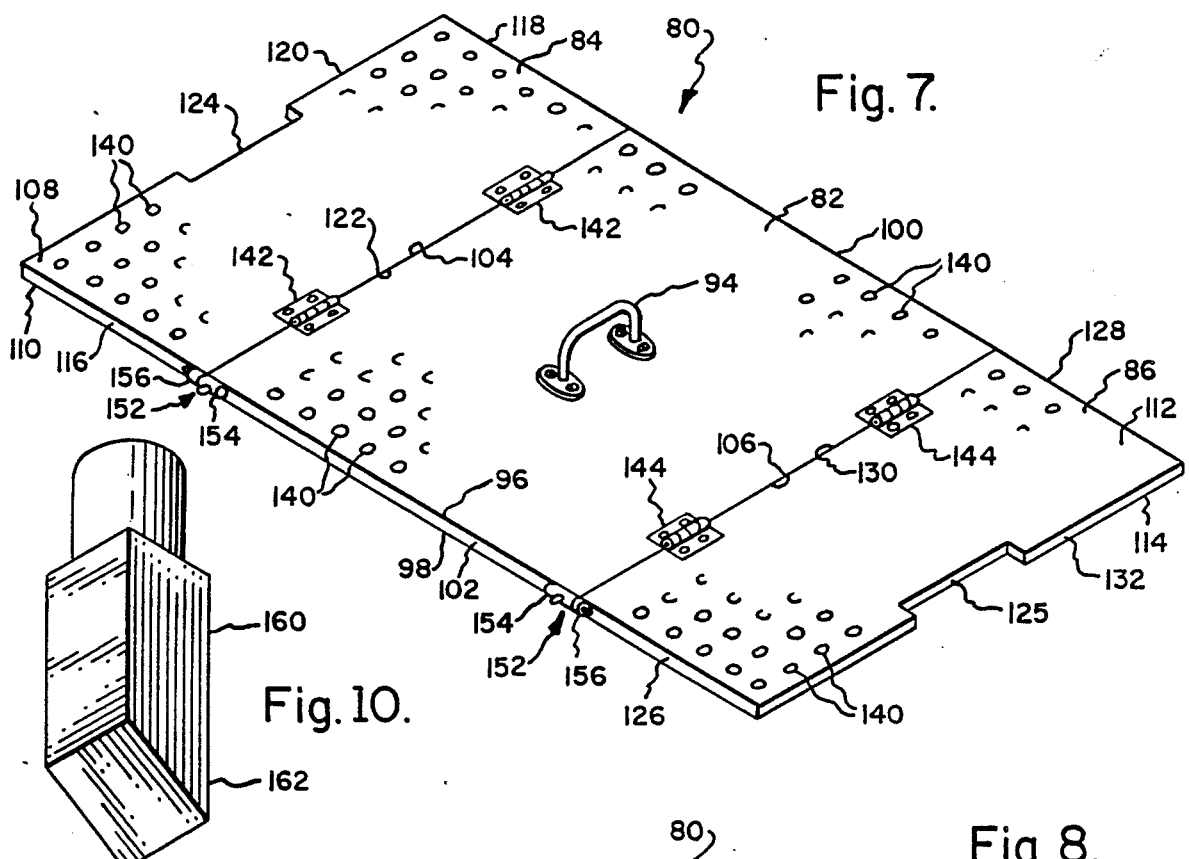
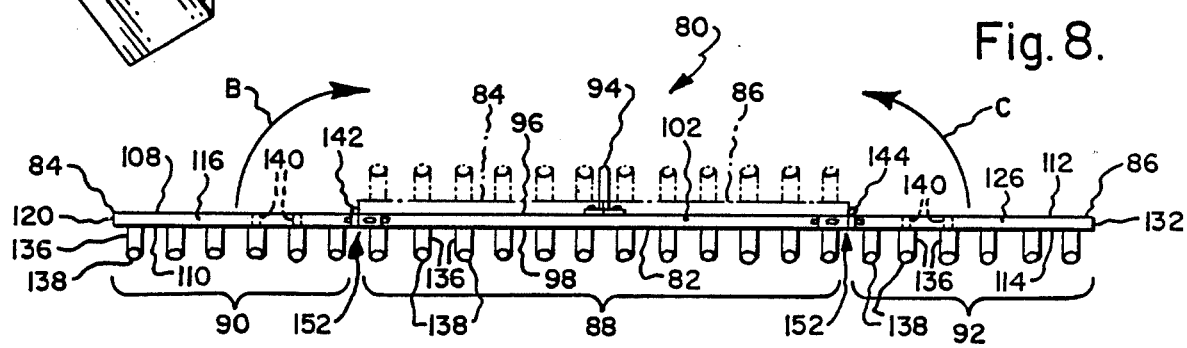
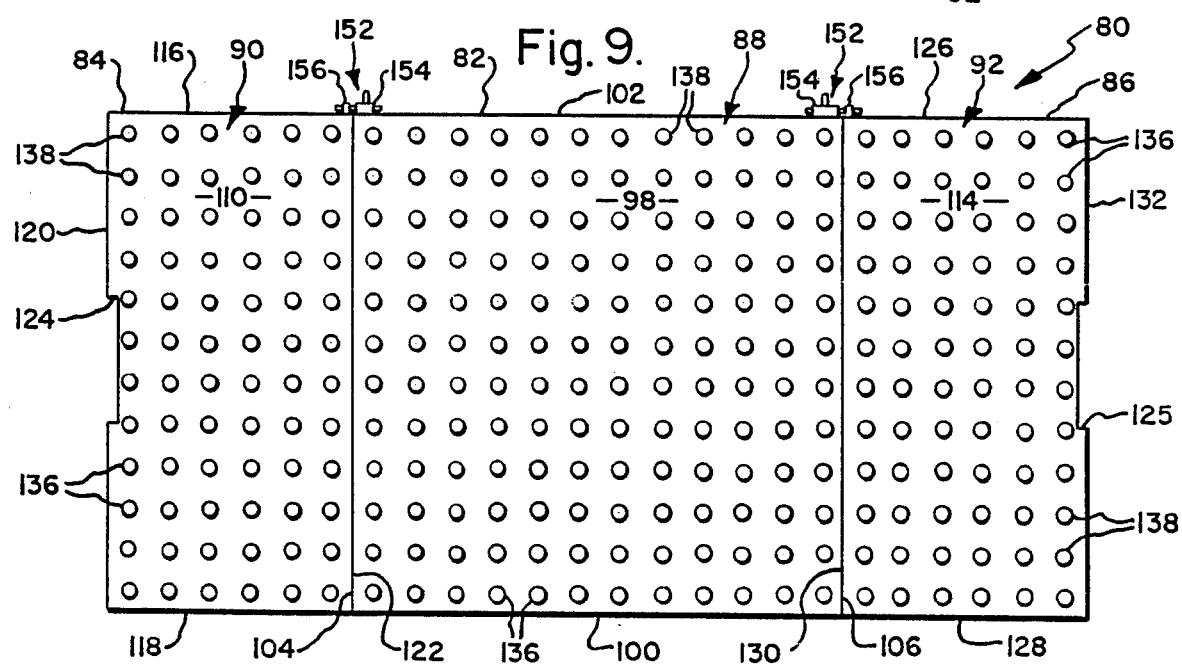

4,934,289

HOLE-FORMING GARDENING DEVICE

BACKGROUND OF THE INVENTION

This invention relates generally to the planting of seeds, bulbs or the like in prepared soil and relates more particularly to the formation of openings in the soil for accepting seeds or bulbs.

While planting seeds, bulbs or the like in soil covering a relatively small area, individual rows or holes are commonly formed in the soil to accommodate placement of the seeds or bulbs therein. Inasmuch as the digging of such individual seed-accepting rows or holes can be a generally time-consuming process, it would be desirable to provide a device which facilitates the formation of seed-accepting holes or recesses.

Accordingly, it is an object of the present invention to provide a new and improved device facilitating the formation of seed-accepting openings or recesses in prepared soil.

Another object of the present invention is to provide such a device for forming a plurality of seed-accepting openings in a single operation.

Still another object of the present invention is to provide such a device facilitating the formation of a large number of seed-accepting openings relatively quickly and in a space-saving manner.

And yet still another object of the present invention is to provide such a device which is particularly well-suited for forming seed-accepting openings in the soil, which openings are arranged in a predetermined pattern.

A further object of the present invention is to provide such a device which accommodates the formation of seed-accepting openings over areas of the soil, which areas are of predetermined shapes or sizes.

A still further object of the present invention is to provide such a device which is uncomplicated in structure and effective in operation.

SUMMARY OF THE INVENTION

This invention resides in a device for forming a plurality of seed or bulb-accepting openings in prepared soil.

The device of this invention includes a platen member, a plurality of pegs and a carrying handle. The platen member has two opposite sides and includes a plurality of recesses disposed across one side of the platen member. Each peg includes two end portions and is attachably received by a corresponding recess of the platen member so that one end portion of each peg projects from one side of the platen member. The carrying handle is attached to the other side of platen member for facilitating placement of the platen member upon and removal of the platen member from the soil.

By placing the platen member one-side-down upon prepared soil and applying pressure to the other side of the platen member and generally toward the soil, the pegs penetrate so as to form indentations in the soil. When the device is subsequently removed from the soil, the indentations formed in the soil by the pegs provide the seed or bulb-accepting recesses.

BRIEF DESCRIPTION OF THE DRAWINGS

FIG. 1 is a perspective view of an embodiment of the present invention shown utilized to form a plurality of seed-accepting openings in prepared soil.

FIG. 2 is a top plan view of the FIG. 1 device as seen generally from above the device in FIG. 1.

FIG. 3 is a bottom plan view of the FIG. 1 device as seen generally from beneath the device in FIG. 1.

FIG. 4 is a cross-sectional view taken about on lines 4—4 of FIG. 2.

FIG. 5 is a view similar to that of FIG. 4 wherein the device is shown partially exploded.

FIG. 6 is a cross-sectional view illustrating the formation of indentations in the soil by means of the FIG. 1 device.

FIG. 7 is a perspective view of an alternative embodiment of the device of this invention.

FIG. 8 is a front elevational view of the FIG. 7 device as seen generally from the left in FIG. 7.

FIG. 9 is a bottom plan view of the FIG. 7 device as seen from below in FIG. 8.

FIG. 10 is a perspective view of a peg utilized in an alternative embodiment of the device of this invention.

DETAILED DESCRIPTION OF THE ILLUSTRATED EMBODIMENTS

Turning now to the drawings in greater detail and considering first FIG. 1, there is shown an embodiment, generally indicated 20, of a device in accordance with the present invention and shown operatively utilized by a planter P to form a plurality of seed-accepting openings in prepared soil S. The device 20 includes a platen member 22, a plurality of pegs 24 (FIG. 3) attached to the platen member 22 so as to project from one side thereof and a handle 26 attached to the side of the platen member 22 opposite the pegs 24. In use, the device 20 is pressed peg-side-down against the soil S to an extent necessary to urge the pegs 24 into the soil, and the device 20 is then lifted from the soil leaving seed-accepting openings therein.

The soil S has been prepared by appropriate tillage or cultivation so that the surface thereof is rendered relatively soft. To ensure that the pegs 24 penetrate the soil S to the desired depth, it is preferred that the soil S be relatively soft for at least a few inches (i.e. three to four inches) deep as measured from the top surface thereof. Furthermore, the soil S contains a degree of moisture so that once the pegs 24 are removed therefrom, indentations of depressions formed in the soil S by the pegs 24 retain the general shape or contours of the pegs 24.

With reference to FIGS. 2–4, the platen member 22 defines opposite top and bottom sides 28,30, respectively, and includes two linear edges 32,34 and an arcuate edge 36. As seen in the plan view of FIG. 2, the platen member 22 is generally in the shape of a sector of a circle with the corner, indicated 33, at which the linear edges 32,34 meet identifying the center of the circle of which the platen member 22 is a sector. In the embodiment 20 illustrated, the platen member 22 has a surface area as viewed in plan which is about equal to one-sixth of the area of a circle having a radius of about two feet (61 cm) as measured along either of the linear edges 32 or 34.

With reference to FIGS. 3–5, there is disposed over the bottom side 30 of the platen member 22 are a plurality of recesses 38. Each recess 38 is in the form of a circular through-opening 40 extending between the sides 28,30, and the recesses 38 are regularly disposed thereover in a pattern simulating the sector of a circle. The platen member 22 is constructed of wood, but it will be understood that the platen member 22 can be constructed out of any of a number of other suitably rigid materials such as metal or hard plastic.

As best shown in FIG. 5, each peg 24 includes a projecting portion 42 and an attachment portion 44 for joining the projecting portion 42 to the platen member 22. The projecting portion 42 is elongated in shape so as to define two opposite end portions 46,48 and defines a cylindrical outer surface 50. A circular recess 52 is formed in the end portion 46 of the projecting portion 42 so as to extend generally axially of the peg 24, and the other portion end 48 is sharpened to a tip 54.

The attachment portion 44 is in the shape of an elongated cylindrical stud 56 having one end 58 which is force-fit within the circular recess 52 of the projecting portion 42 and another end 60 adapted to be snuggly and releasably received by an opening 40 in the platen member 22. To this end, the stud 56 is slightly larger in diameter than the diameter of the circular recess 52 so that when force-fit within the recess 52, the stud 56 is securely attached to the peg projecting portion 42 and is slightly larger than the diameter of the corresponding platen member opening 40. The stud end 58 can thereby be selectively inserted within and thereby snuggly retained by the opening 40 and withdrawn from the opening 40 to accommodate the use of the device 20 without one or more of the pegs 24.

It will be understood that the attachment portion 44 of each peg 24 cooperates with the platen member opening 40 to support each peg 24 at a generally right angle to the plane of the platen member 22. Hence, each of the pegs 24 are arranged generally parallel to one another and perpendicular to the platen member bottom surface 28.

Each of the securement and attachment portions 42,44 of the pegs 24 can be comprised of any of a number of suitable materials such as wood, hard plastic or metal. Furthermore, although each of the pegs 24 have been shown and described as being constructed of individual attachment and securement portions 42 and 44, it will be understood that each peg 24 could be formed or molded as a single, integral unit in accordance with the broader aspects of this invention.

With reference again to FIGS. 1 and 2, the handle 26 is generally arcuate in shape having two opposite end portions 62,64 which terminate in a single plane. Each end portion 62 and 64 define outwardly-extending flanges 66, and each flange 66 defines a plurality of screw-accepting apertures. The handle 26 is secured to the top side 30 of the platen member 22 by means of screws 68. The shanks of the screws 68 extend through the apertures defined in the handle flanges 66 so that each flange 66 is securely held between the head of the screws 68 and the top side 28 of the platen member 36. The handle 26 can be constructed of any of a number of suitable materials such as wood, metal or plastic.

As best shown in FIG. 2, the handle 26 is disposed generally centrally of the top side 30 and relatively close to the center of gravity of the platen member 22. By locating the handle 26 as aforesaid, the handle 26 can be grasped with one hand and the device 20 lifted from the soil S (FIG. 1) by the handle 26 in a manner exposing the hand to little or no twisting stress. Hence, the handle 26 facilitates the carrying of the device 20 from one site to another and, as will be apparent hereinafter, facilitates the placement 20 upon and removal of the device 20 from the surface of the soil S.

To utilize the device 20, and as illustrated in FIG. 1, the platen member 22 is positioned upon the surface of the soil S so that the bottom side 30 thereof generally faces downwardly and so that the pegs 24 engage the soil S. At that point, pressure is applied to the top side 30 of the device 20 generally in the direction of the soil S so that the pegs 24 penetrate the soil S to a depth equivalent to the full length of the projecting portion 24. Hence, the platen member 22 is pressed downwardly against the soil S until the bottom side 30 thereof flatly engages the soil S.

If the soil S is quite soft, the pegs 24 can be pressed into the soil S with a relatively small amount of downwardly-directed applied to the platen member 22. If, on the other hand, the soil S is relatively firm, the planter P may be required to step upon the top surface 28 of the platen member 22 so that his feet are positioned on opposite sides of the handle 26 for purposes of applying his weight atop the device 20. It follows that the breath of the platen member 22 as measured between the linear edges 34,34 and across the handle 26 is sufficient in size to accommodate the placement of the feet of the planter P thereupon and the rigidity of the platen member 22 is sufficient to withstand the weight of the planter P without damage.

As the pegs 24 penetrate the soil S, the soil adjacent the pegs 24 is compressed generally outwardly and downwardly to accommodate movement of the pegs 24 therethrough. Each peg 24 thereby defines an indentation 72, illustrated in FIG. 6 in the soil S. Once the pegs 24 have penetrated the soil S to a depth equivalent to the projecting portion 22, and with reference still to FIG. 6, the device 20 is removed from the soil S generally in the direction of the arrow A so that the pegs 24 are withdrawn from the defined indentations 72. With the device 20 removed from the soil S as aforesaid, the indentations 72 formed in the soil are exposed to the planter P.

It will be understood that the indentations 72 provide the desired seed-accepting openings or recesses 74 in the soil S into which the planter P places his seeds or the like for planting. Once the seed is positioned within the bottom of the opening 74, each opening 74 is refilled with soil in a manner covering the seeds place therein.

For purposes of illustration, the following dimensions and particulars are provided for the device 20. The length of each of the linear edges 32 and 34 and arcuate edge 36 is about two feet (61 cm) in length, each projecting portion 42 of each peg 24 is about 0.75 inches (1.9 cm) in diameter and about 1.25 inches (3.2 cm) in length as measured from end 46 to tip 54. Furthermore and as best shown in FIG. 3, the pegs 24 are regularly spaced or disposed across the bottom surface 30 of the platen member 22 in a plurality of arcuate rows 76,76 each of which extends between the member edges 32 and 34. In the device 20, there are provided sixty-six pegs 24 which project from the platen member bottom side 30. The device 20 having the aforedescribed dimensions and particulars have been found to be particularly well-suited for purposes of planting onions or similar vegetables which can grown relatively close together.

The device 20 is advantageous and provides the planter P with means for simultaneously and quickly forming a plurality of regularly-spaced seed-accepting openings of uniform depth in a single operation. Furthermore and inasmuch as the pegs 24 are spaced relatively close together, the seed-accepting openings 72 formed by the pegs 24 are spaced relatively close together. Such a close spacing of the pegs 24 is believed to promote the efficient utilization of garden space and can be readily appreciated if the garden plot within which the seeds are to be planted is relatively small.

Still further and because the pegs 24 are disposed across the bottom side 30 of the platen member in an arrangement simulating a sector of a circle which is about equal in area to one-sixth the area of the circle, the device 20 can be utilized to form a circular arrangement of seed-accepting openings 72 in a relatively prompt manner. For example and in order to form such a circular arrangement of openings 72, the device 20 is pressed against and subsequently removed from the soil S in a manner forming one sector-shaped group of openings 72 and then the device 20 is pressed against and subsequently removed from the soil S five additional times after appropriately shifting the device 20 to a new location on the soil S to complete the circular arrangement of openings 72.

With reference to FIGS. 7-9, there is shown an alternative embodiment, generally indicated 80, of a device in accordance with the present invention. The device 80 includes a first platen member 82, a second platen member 84 and a third platen member 86 hingedly joined together for pivotal movement relative to one another in a manner hereinafter described. Associated with each of the first, second and third platen members 82, 84 and 86 are first, second and third sets of pegs 88,90 and 92, respectively. Furthermore, the device 80 includes a carrying handle 94 operatively attached to the platen member 82.

The first platen member 82 defines opposite top and bottom sides 96,98, respectively, and as viewed in the plan view of FIG. 9 is generally rectangular in shape so as to define front and rear edges 100,102, respectively and opposite side edges 104,106 as shown. Similarly, the second platen member 84 defines opposite top and bottom sides 108,110, respectively, while the third platen member 86 defines opposite top and bottom sides 112,114, respectively. As viewed in the plan view of FIG. 9, the second platen member 84 is generally rectangular in shape so as to define front and rear edges 116,118, respectively, and opposite side edges 120,122. A cutout 124 is defined substantially midway along the length of the side edge 120. As viewed in the plan view of FIG. 9, the third platen member 86 is generally rectangular in shape so as to define front and rear edges 126,128, respectively, and opposite side edges 130,132. A cutout 125 is defined substantially midway along the length of the side edge 132. The width of each of the second and third platen members 84,86 as measured between its corresponding side edges 120,122 or 130,132 is about one half the width of the first platen member 82 as measured between its side edges 104,106.

Each of the first, second and third sets of pegs 88,90 and 92 include a plurality of pegs 136. Each peg 136 is similar in construction to that of each peg 24 of the device 20 of FIGS. 1-6 in that each peg 136 defines a cylindrically-surfaced, pointed end 138 projecting from the bottom side of a corresponding platen member 82,84 or 86 and an opposite cylindrically-surfaced reduced end portion 140 (FIG. 8). Each of the first, second and third platen members 82,84,86 define a plurality of circular recesses 134 in its bottom surface within which the pegs 136 are releasably secured. More specifically, each recess 134 is in the form of a through-opening adapted to snuggly receive the reduced end portion 140 of a corresponding peg 136 so that each peg 136 is secured to its corresponding platen member 82, 84 or 86 when inserted reduced end-first within the recess 134. As best shown in FIG. 9, the pegs 136 are disposed across the bottom side of each platen member 82,84 or 86 in a substantially rectangular arrangement so that the pegs 136 are arranged in substantially linear rows and columns.

The carrying handle 94 is generally arcuate in shape and secured at its opposite ends to the top side 96 of the first platen member 92 by means of screws. As best shown in FIGS. 7 and 8, the carrying handle is positioned substantially centrally of the top side 96 and proximate to the center of gravity of the device 80 when the platen members 82,84 and 86 are positioned in a coplanar condition as shown in FIG. 7.

In accordance with the present invention, each of the second and third platen members 84 and 86 are hingedly secured to the first platen member 84 for pivotal movement between operative and inoperative conditions. To this end, the device 80 includes a pair of hinges 142 hingedly joining the side edge 104 of the first platen member 82 and the side edge 122 of the second platen member 84. Similarly, the device 80 includes a pair of hinges 144 hingedly joining the side edge 106 of the first platen member 82 and the side edge 130 of the third platen member 82 and the side edge 130 of the third platen member 86. Joined as aforesaid, each of the second and third platen members 84,86 are pivotally movable relative to the first platen member 82 in the directions indicated by an arrow B or C between an operative condition as shown in solid lines in FIG. 8 and a non-operative condition as shown in phantom in FIG. 8. In the aforesaid operative condition, the first, second and third platen members 82,84,86 are generally coplanar so that all of the pegs 136 are generally parallel to one another and project beneath the bottom sides 98,100,114 of the platen members 82,84,86.

In the aforesaid non-operative condition, the second and third platen members 84, 86 are folded back so as to overlie the top side 96 of the first platen member 84 and so that the pegs 136 attached to the second and third platen members 84,86 are directed generally upwardly. It will be understood that when positioned in the non-operative condition, the second and third platen members 84,86 are not coplanar with the first platen member 82. As best shown in FIG. 8, the carrying handle 94 is accommodated by and so as to project through the platen member cutouts 124,125 when the second and third platen members 84,86 are positioned in the non-operative condition.

In accordance with the present invention, the device 80 further includes means, generally indicated 150, for locking the first, second and third platen members 82,84,86 in the operative condition. To this end, the locking means 150 includes a pair of dead bolt arrangements or assemblies 152,152 operatively attached to the front edge 100,116, 126 of the platen members 82, 84, 86. Each dead bolt arrangement 152 includes a dead bolt 154 and appropriate mounting hardware attached to the front edge 100 of the platen member 82 permitting the dead bolt 154 to be slidably moved relative to along the front edge 100 between locking and unlocking conditions. Each dead bolt arrangement 152 further includes a dead bolt receptacle 156 attached to a corresponding front edge 116 or 126 of the second and third platen members 84,86 for slidably receiving the dead bolt 184 when the dead bolt 154 is moved to its locking condition.

It follows from the foregoing that when the dead bolt arrangements 152,152 are utilized to secure the platen members 82,84,86 in the operative condition, the pegs 136 in each set 88,90,92 are generally parallel to one another face generally in the same direction. Therefore, the device 80 can be utilized with all three peg sets 88,90 and 92 directed downwardly for forming a plurality of seed-accepting openings in the soil over a relatively large area. Alternatively, the second and third platen members 84,86 can be moved to the non-operative condition for utilization of the device 80 in a manner forming seed-accepting openings with only the first set of pegs 88 directed downwardly. Hence, the device 80 is advantageous in that the size of the area within which seed-accepting openings can be formed in a single operation can be varied. The device 80 has been found to particularly well-suited for forming seed-accepting openings in prepared soil adjacent a sidewalk.

It will be understood that numerous modifications and substitutions can be had to the aforedescribed embodiments without departing from the spirit of the invention. For example, although the pegs 24 and 136 of the aforedescribed embodiments 20 and 80 have been shown and described as including cylindrically-surfaced portions 46 and 138, respectively, adapted to penetrate the soil, such a soil-penetrating portion may possess an alternative shape or configuration. For example, there is illustrated in FIG. 10 a peg 160 having a soil-penetrating portion 162 which is substantially square in cross-sectional shape. A peg 160 of such cross sectional shape may be desired in some instances, such as for example, during the planting of relatively large bulbs. Accordingly, the aforedescribed embodiments are intended for purposes of illustration and not as limitation.

I claim:

1. A device for forming a plurality of openings in prepared soil for accepting seed, bulbs or the like comprising:

a first platen member having two opposite sides and including a plurality of recesses disposed across one side of said platen member;

a first plurality of pegs each including two opposite ends and supportedly positioned within said recesses to that one end of each peg projects from said one side of the platen member so that by placing said platen member said one-side-down upon prepared soil so that said pegs engage the soil and applying a moderate amount of pressure to the other side of said platen member and generally toward the soil, said pegs penetrate the soil so as to form indentations therein;

a carrying handle attached to said other side of the platen member for facilitating placement of the platen member upon and removal of the platen member from the soil so that upon removal of said device from the soil in a manner withdrawing said pegs from the formed indentations, the indentations provide openings in the soil for accepting seeds, bulbs or the like;

a second platen member having two opposite sides and including a plurality of recesses disposed across one side of said second platen member;

a second plurality of pegs each including two opposite ends and supportedly positioned with the recesses of said second platen member so that one end of each peg of the second plurality of pegs projects from one side of said second platen member, said second platen member being hingedly attached to said first platen member along one side edge thereof for movement relative to said first platen member between an operative condition at which said first and second platen members are substantially coplanar and the one end of each peg of the second plurality of pegs project from said one side of said second platen member in generally the same direction that the one end of each peg of the first plurality of pegs projects from said one side of said first platen member and a non-operative, out-of-the-way condition at which said first and second platen members are not coplanar so that by positioning said first and second platen members in said operative condition and placing said first and second platen members said-one-side-down upon the soil and applying a moderate amount of pressure to the other side of said first and second platen members and generally toward the soil, said first and second plurality of pegs penetrate the soil so as to form indentations therein so that upon removal of the device from the soil in a manner withdrawing said first and second plurality of pegs from the formed indentations, the formed indentations provide openings in the soil for accepting seeds, bulbs or the like;

a third platen member including two opposite sides and including a plurality of recesses disposed across one side of said platen member;

a third plurality of pegs including two opposite ends and supportedly positioned within the recesses of said third platen member so that one end of each peg projects from said one side of said third platen member, said third platen member being hingedly attached to said first platen member along the other side edge thereof for hinged movement relative to said first platen member between an operative condition at which said first and third platen members are substantially coplanar and the one end of each peg of the third plurality of pegs projects from said one side of said third platen member in generally the same direction that the one end of each peg of the first plurality of pegs projects from said one side of said first platen member and a non-operative, out-of-the way condition at which said first and third platen members are not coplanar so that by positioning said first and second platen members in said operative condition and placing said first and third platen members said one-side-down upon the soil and applying a moderate amount of pressure to the other side of said first and third platen members and generally toward the soil, said first and third plurality of pegs penetrate the soil so as to form indentations therein so that upon removal of the device from the soil in a manner withdrawing said first and third plurality of pegs from the formed indentations, the indentations formed by each of the first and third plurality of pegs provide openings in the soil for accepting seeds, bulbs or the like;

each of said first, second and third platen members being of such size and arranged in a parallel relationship with one another that each of said second and third platen members are hingedly movable relative to the first platen member from the operative condition to a non-operative condition at which each of said second and third platen members is folded back so as to overlie a portion of said first platen member and so that the pegs of each of said second and third plurality of pegs is directed generally opposite the direction in which each peg of said first plurality of pegs is directed thereby allowing only said first plurality of pegs to be used, each of said second and third platen members being about the same size and shape and said device further including a carrying handle attached to said other side of said first platen member and proximate to the center of gravity of said device when each of said second and third platen members are positioned in the operative condition; and each of said second and third platen members defining a cutout along one side edge thereof for accommodating the carrying handle when said second and third platen members are positioned in the non-operative condition at which said second and third platen members are positioned so as to overlie said first platen member.

2. The device as defined in claim 1 further comprising means for locking said first, second and third platen members in the operative condition so that the application of a moderate amount of pressure to the other side of only one of said first, second or third platen member and generally toward the soil forces the plurality of pegs of all three of said first, second and third platen members to penetrate the soil as aforesaid.

* * * * *